United States Patent [19]
Jantzen

[11] 3,800,318

[45] Mar. 26, 1974

[54] HELICAL TAPE GUIDE

[75] Inventor: Johannes K. Jantzen, Mountain View, Calif.

[73] Assignee: International Video Corporation, Sunnyvale, Calif.

[22] Filed: Oct. 26, 1972

[21] Appl. No.: 301,062

[52] U.S. Cl. .............................. 360/84, 242/195

[51] Int. Cl. .............................................. G11b 15/66

[58] Field of Search ............... 179/100.2 T, 100.2 Z; 242/195, 192, 198, 76, 78.8; 226/91, 92

[56] References Cited

UNITED STATES PATENTS

| | | | |
|---|---|---|---|
| 3,598,926 | 8/1971 | Umeda | 179/100.2 T |
| 3,123,272 | 3/1964 | Pollaschek | 179/100.2 T |
| 3,354,269 | 11/1967 | Rank | 179/100.2 T |
| 3,375,331 | 3/1968 | Okazaki et al. | 179/100.2 T |
| 3,661,311 | 5/1972 | Warren | 179/100.2 T |
| 3,691,315 | 9/1972 | Ellmore | 179/100.2 T |
| 3,150,840 | 9/1972 | Briskin et al. | 179/100.2 Z |

*Primary Examiner*—Daryl W. Cook
*Assistant Examiner*—Alfred H. Eddleman
*Attorney, Agent, or Firm*—Limbach, Limbach & Sutton

[57] ABSTRACT

A helical tape guide around a stationary drum encasing a rotating scanner assembly, the tape guide has a plurality of curved plates arranged around and displaced from the drum and a series of spatially positioned pins projecting from the plates into corresponding holes in the drum, the pins being arranged in a helical path around the drum forming a guide path for the lead end of a tape leader threaded around the drum by a tape mechanism.

3 Claims, 3 Drawing Figures

PATENTED MAR 26 1974

3,800,318

HELICAL TAPE GUIDE

BACKGROUND OF THE INVENTION

This invention relates in general to a tape transport system, and, in particular to a guide for the automatic threading of a magnetic tape around a helical scanner assembly in a video recorder system.

In tape transport systems having an automatic threading feature, a relatively stiff tape leader is customarily attached to the end of a flexible magnetic tape for transporting the tape from a position displaced from the lead end of the leader. A tape recorder having recording transducers mounted in a rotary scanning assembly may require that the tape be helically wrapped around a drum structure for orienting the tape with respect to the rotating scanning transducers for recording on a series of diagonally patterned tracks across the recording surface of the tape. Although proper helical orientation of the tape around the drum during operation can be maintained by guides adjacent the beginning and end of the wrap, it is necessary to include additional guides around the periphery of the drum if it is desired that the recorder be automatically or self-threaded.

In providing guides around the drum, extreme care must be taken not to disturb the close tolerances between the drum and scanning rotor assembly. It is necessary that a guide structure be provided which is as structurally independent as possible to avoid drum distortion and therefore poor quality in the overall recorder.

SUMMARY OF THE INVENTION

The invented helical tape guide of this invention comprises a plurality of curved plates attached to a structure ancillary to the drum around the scanning assembly. The curved plates are displaced from the surface of the drum to permit a recording tape to be wrapped around the drum without contacting the plates during operation. To guide the end of a tape leader in a helical path around the drum, a series of pins protrude from the plates and are directed at corresponding holes or depressions in the drum. The holes are deliberately oversized to allow the pins to extend into the holes without contacting the drum. In this manner the guide structure is maintained independent of the drum while sufficiently integral therewith to prevent a tape leader from snagging under a pin. The holes in the drum are of such an insignificant structural alteration in the drum that the symmetry of the drum is in no way distorted or otherwise adversely affected by their inclusion.

DETAILED DESCRIPTION OF THE PREFERRED EMBODIMENT

Figures 1, 2, 3:
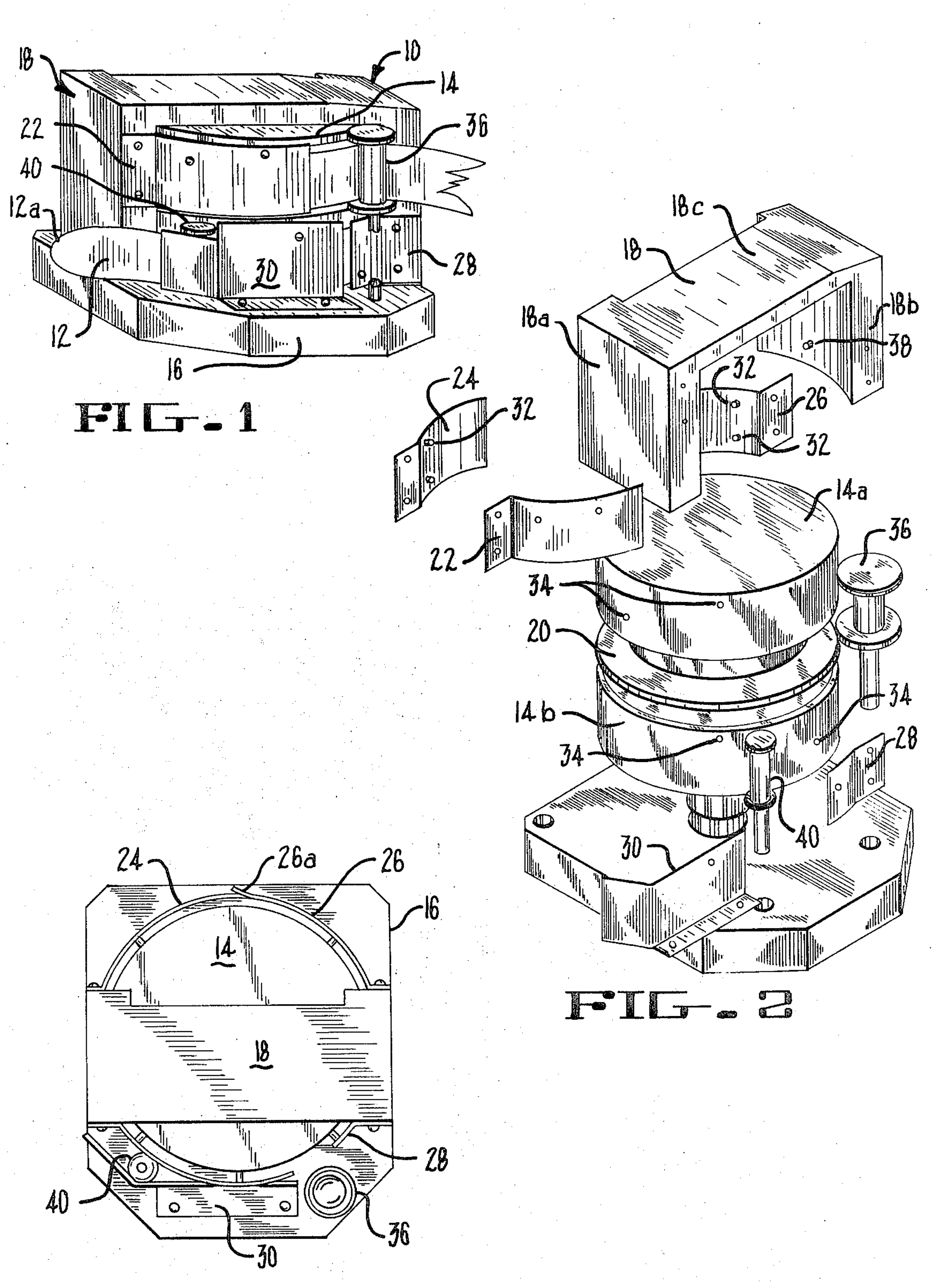
FIG. 1 is a perspective view of the tape guide and scanner drum assembly for a helical wrap tape recorder system.
FIG. 2 is an exploded view of the tape guide and scanner drum assembly of FIG. 1.
FIG. 3 is a plan view of the tape guide and scanner drum assembly of FIG. 1.

Referring to the perspective view of FIG. 1, a scanner unit 10 is shown having a relatively stiff tape leader 12 helically wrapped around a drum 14 in the unit. The unit essentially comprises the recording transducer portion of a helical tape recorder machine (not shown) of the type having a tape supply reel, an automatic tape transport drive for self feeding of a tape leader and a tape storage or take-up reel. For purposes of this disclosure the tape transport drive can be any conventional drive mechanism which transports a relatively stiff tape or tape leader from a position displaced from the lead end of the tape or leader. For example, a simple drive capstan or puck and a cooperating pinch roller provide an adequate drive for the scanner unit of this disclosure. -

Referring again to FIG. 1, the scanner unit includes a base 16 on which the essential components are supported. The base can be mounted to the deck of a recording machine for cooperative operation therewith. On the base is mounted a bridge 18 which includes two vertical integral columns 18*a* and 18*b*, and a top cross-member 18*c*. The drum 14, as shown more clearly in FIG. 2, is divided into a top section 14*a* and a bottom section 14*b* which are displaced from one another to permit a scanning rotor 20 carrying one or more recording transducers (not visible) on its peripheral edge to project therebetween for positioning the transducers substantially at or above a plane with the outer surface of the two drum sections. The bridge 18 is therefore necessary to support the upper section of the drum in spaced relation with the lower section.

Arranged around the drum and attached to the bridge 18 and base 16 are five guide plates, 22, 24, 26, 28 and 30, respectively, which are displaced from and contoured to the curvature of the outer surface of the drum. The plates each have one or more guide pins 32 projecting from the inner or concave surface of the plates. The pins are directed into corresponding holes 34 in the surface of the two drum section 14*a* and 14*b*. The holes 34 are formed with a diameter greater than the diameter of the pins. For example, in the preferred embodiment the pins 30 clear the edge of the holes by approximately 0.03 inch. In this manner the guide structure is maintained substantially independent of the drum in order that the drum be free from distortion from an appended structure.

The pins 32 on the plates and the corresponding holes in the drum are arranged in a helical pattern around the periphery of the drum to provide a vertical guide to the top and bottom edges of the tape leader 12. Horizontal guidance, forcing the tape leader around the drum is of course accomplished by the inner surface of the plates. The plates and the inner surfaces of the two vertical columns, 18*a* and 18*b*, of the bridge 18 effectively form an outer cover around the drum as illustrated in FIG. 3.

Upon initiation of an automatic or self-threading operation, out a tape leader, transported to the scanner unit 10 by an appropriate tape transport mechanism and guide chutes (not shown), is first directed tangentially at the upper drum section 14*a* by a guide 36 and the end 22*a* of guide plate 22. The lead end 12*a* of the relatively stiff leader is rounded to catch the pins 32 and for guiding of the tape down and around the drums. From plate 22 the leader is directed around the inner surface of column 18*a* to plate 24 and hence to plate 26. The end 26*a* of plate 26 is flared slightly outward as shown in FIG. 3 to prevent the lead end 12*a* of the leader from catching on the plate end during the threading sequence in the scanner unit. From plate 26 the lead end is guided around the inner surface of vertical column 18*b*, to the small plate 28. As shown in the exploded view of FIG. 2, column 18*b* of the bridge 18 has a guide pin 38 to assist in tape guidance around the drum. Similar pins may be included on the other column 18*c*, but have been found to be unnecessary for most operating conditions. Variations in threading speed or leader stiffness may require the inclusion of additional pins on both the columns and plates.

From plate 28, the lead end of the leader is guided around plate 30 between the end 30*a* of plate 30 and guide 40, as in FIG. 1 and 3, and hence to a take-up or storage reel by appropriate structure. Alternatively, according to the particular design of supporting components in a recorder, the tape leader can be threaded in a reverse manner, entering at plate 30 and exiting at plate 22.

As shown in the drawings the plates 22, 24, 26, and 28 are fastened to the columns 18*a* and 18*b* of the bridge by screws. Exit plate 30 is fastened directly to the base 16. In this manner the plates and pins comprise a guide structure which forms a helical chute around the drum without distorting the structural configuration of the drum. In this respect the necessary accurate tolerances are maintained between the stationary drum and the scanner rotor which rotates at high angular velocities between the upper and lower sections of the drum.

While the preceeding disclosure describes a preferred embodiment, it is not intended to limit the scope of the invention as defined by the claims.

I claim:

1. In a tape recorder device having a helical scanner unit with a stationary drum and an inner scanner rotor, a tape guide for threading a magnetic tape having a relatively stiff leader around said drum without said guide substantially distorting the symmetry of the drum, the tape guide comprising:

at least one surface means arranged in substantial part around the stationary drum and displaced therefrom;

a plurality of pins attached to and projecting from said surface means, said pins being arranged in a helical pattern around the outer surface of said drum and directed into the surface of said drum, wherein said drum is adapted to receive said pins without contact between said drum and said pins.

2. In a tape recorder device having a helical scanner unit with a stationary drum and an inner scanner rotor, a tape guide for threading a magnetic tape having a relatively stiff leader around said drum without said guide substantially distorting the symmetry of the drum, the tape guide comprising:

a support structure arranged adjacent the stationary drum, a plurality of plates attached to said support structure, the plates having concave surfaces which conform to and are displaced from an outer surface of said drum, a plurality of guide pins attached to and projecting from the concave surface of the plates directed into the outer surface of said drum and arranged in a helical pattern around said drum, wherein said drum is adapted to receive said pins by inclusion of holes in the surface of said drum of diameter greater than said pins, which holes are arranged in corresponding concentric relationship with said pins without contacting said pins.

3. The apparatus of claim 1 in combination with tape drive means adapted to drive a rounded lead end of a relatively stiff leader into said tape guide and around the drum of the helical scanner unit.

* * * * *